Patented July 25, 1933

1,919,454

UNITED STATES PATENT OFFICE

WILLIS C. WARE, OF CHICAGO, ILLINOIS, ASSIGNOR OF ONE-HALF TO EDWARD B. SICKLE, OF CHICAGO, ILLINOIS

ADHESIVE

No Drawing.     Application filed April 22, 1931. Serial No. 532,112.

The present invention relates generally to adhesives. More particularly, the invention relates to that type of adhesive which is plastic in character and serves to secure in place sound-absorbing blocks, glass plates or panels, cement tiles and like structural elements.

The object of the invention is to provide an adhesive of the aforementioned type which is generally an improvement upon previously devised adhesives for the same purpose and is characterized by the fact that it is chemically inert and remains plastic at all times, effects an immediate bond for the elements with which it is used and hence dispenses with the necessity of temporarily holding the elements in place by nailing or shoring, and is of such consistency that it may be used to build out the structural elements from the walls or surfaces to which they are bonded.

The adhesive which forms the subject matter of the invention consists of a resinous base, a non-volatile and non-oxidizing plasticizer for the base, a fibrous binder and a volatile substance. Pure rosin or a natural or synthetic resinous gum is used as the base and tends to render the adhesive of a glutinous or viscous character. Petrolatum, castor oil, paraffin residue or crude oil is used as the plasticizer and serves to keep the base at all times in a plastic condition. In making the adhesive, the pure rosin or resinous substance which forms the base is first melted. The plasticizer is then added to the base while the latter is in a molten condition. The binder is preferably in the form of asbestos fiber and is added to the rosin after the latter has been plasticized with the petrolatum, castor oil, paraffin residue or crude oil. The asbestos fiber which serves as the binder tends to increase the tensile strength of the adhesive and to give the adhesive the desired body or consistency. Naphtha, carbon tetrachloride or benzol is used as the volatile substance and serves to thin the adhesive so as to make it workable. The base, plasticizer, binder and volatile substance are preferably used in the following proportions:

3 parts by weight base (rosin); 1 part by weight plasticizer (petrolatum); 2½ parts by weight binder (asbestos fiber); and 1 part by weight volatile substance (naphtha).

In practice it has been found that the rosin can be plasticized with no greater than an equal amount of petrolatum, otherwise the adhesive will be too soft and runny and not sufficiently adhesive for the purpose for which it is designed.

The adhesive is of extremely heavy consistency and serves efficiently and effectively to hold in place sound-absorbing blocks, glass plates or panels, cement tiles and like structural elements. It remains plastic at all times, is waterproof, requires no setting period and will not deteriorate or change chemically. Upon evaporation of the volatile substance, a chemically inert, permanently plastic, semi-transparent mass remains.

The adhesive is used by applying it in large quantities to the back marginal portions of the structural elements. After application of the adhesive to the structural elements, the latter are placed against the wall or surface to which they are to be bonded, and are then pressed towards the wall or surface and slid into place, so as to spread the adhesive and unite the latter with the wall or surface and the contiguous face portions of the structural elements. By virtue of the fact that the adhesive requires no setting period and is in the nature of a permanently plastic mass, an immediate bond is effected for the structural elements and it is not necessary to nail or shore the latter temporarily in place. Since the adhesive is extremely heavy as far as consistency or body is concerned, it is possible, in applying structural elements to a wall or surface by means of the adhesive, to use the adhesive as a filler and thus space the elements any desired distance from the wall or surface. The adhesive has special utility when used in connection with sound-absorbing blocks or composition slabs in that it is resilient by virtue of the fact that it is permanently plastic and hence augments or tends to increase the sound-absorbing property of the blocks. In connection with breakable panels of glass or similar material, the adhesive has special utility in that it absorbs shocks or vibrations and thereby prevents breakage. In view of the fact that the adhesive is plastic at all times, it is possible to remove at any time structural elements bonded together or to a wall by the adhesive and to put such elements back in place without the use of additional adhesive.

The herein disclosed adhesive may be manufactured at a comparatively low cost and serves effectively and efficiently to hold structural elements in place. It may be applied to practically any wall or like surface without special preparation of such wall or surface and will not discolor the structural element with which it is used inasmuch as it is chemically inert.

Whereas the adhesive has been described as consisting of three parts base, one part plasticizer, two and one-half parts stiffener and one part volatile substance, it is to be understood that the ingredients may be used in different proportions.

Having thus described the invention, what I claim as new and desire to secure by Letters Patent, is:

1. A permanently plastic adhesive adapted to secure structural elements to walls and ceilings and formed of a resinous base material plasticized with no greater than an equal amount of material selected from the group consisting of petrolatum, castor oil, paraffin residue and crude oil, and an admixture of a volatile substance adapted to render the adhesive workable for application purposes without changing it chemically and, upon evaporation thereof, to leave the adhesive in a thicker plastic condition.

2. A permanently plastic adhesive adapted to secure structural elements to walls and ceilings and consisting of a resinous base material plasticized with material selected from the group consisting of petrolatum, castor oil, paraffin residue and crude oil, a binder mixed with the plasticized base material, and an admixture of a volatile substance adapted to render the adhesive workable for application purposes without changing it chemically and, upon evaporation thereof, to leave the adhesive in a thicker plastic condition.

3. A permanently plastic adhesive adapted to secure structural elements to walls and ceilings and consisting of a resinous base material plasticized with no greater than an equal amount of a non-volatile, non-oxidizing, oily plasticizer substance, a fibrous binder mixed with, and in less amount than, the plasticized base material, and an admixture of a volatile substance adapted to render the adhesive workable for application purposes without changing it chemically and, upon evaporation thereof, to leave the adhesive in a thicker plastic condition.

4. A permanently plastic adhesive adapted to secure structural elements to walls and ceilings and consisting of a resinous base material plasticized with no greater than an equal amount of a non-volatile, non-oxidizing, oily plasticizer substance, a fibrous binder mixed with the plasticized base material, and an admixture of naphtha adapted to render the adhesive workable for application purposes; and, upon evaporation thereof, to leave the adhesive in a thicker plastic condition.

5. A permanently plastic adhesive adapted to secure structural elements to walls and ceilings and consisting of rosin plasticized with no greater than an equal amount of petrolatum, a binder mixed with, and in less amount than, the plasticized rosin, and an admixture of a volatile substance adapted to render the adhesive workable for application purposes without changing it chemically and, upon evaporation thereof, to leave the adhesive in a thicker plastic condition.

6. A permanently plastic adhesive adapted to secure structural elements to walls and ceilings and consisting of rosin plasticized with no greater than an equal amount of petrolatum, a binder mixed with the plasticized rosin, and an admixture of naphtha adapted to render the adhesive workable for application purposes and, upon evaporation thereof, to leave the adhesive in a thicker plastic condition.

7. A permanently plastic adhesive adapted to secure structural elements to walls and ceilings and consisting of rosin plasticized with petrolatum, a fibrous binder mixed with, and in less amount than, the plasticized rosin, and an admixture of naphtha adapted to render the adhesive workable for application purposes and, upon evaporation thereof, to leave the adhesive in a thickened plastic condition.

8. A permanently plastic adhesive adapted to secure structural elements to walls and ceilings and consisting of rosin plasticized with no greater than an equal amount of petrolatum, a binder of asbestos fiber mixed with, and in less amount than, the plasticized rosin, and an admixture of naphtha adapted to render the adhesive workable for application purposes and, upon evaporation thereof, to leave the adhesive in a thicker plastic condition.

9. A permanently plastic adhesive adapted to secure structural elements to walls and ceilings and consisting of a resinous base material, a non-volatile, non-oxidizing, oily plasticizer, a fibrous binder, and a volatile substance, mixed together in substantially the following proportions: three parts by weight base material; one part by weight plasticizer; two and one-half parts by weight binder; and one part by weight volatile substance.

10. A permanently plastic adhesive adapted to secure structural elements to walls and ceilings and consisting of a mixture of the following ingredients: three parts by weight rosin; one part by weight petrolatum; two and one-half parts by weight asbestos fiber; and one part by weight naphtha.

WILLIS C. WARE.